United States Patent [19]

Pavincic

[11] 4,401,315
[45] Aug. 30, 1983

[54] FOOTREST FOR TWO-WHEELED ENGINE DRIVEN VEHICLES AND BICYCLES

[76] Inventor: Ivan Pavincic, 28 Glenn Ct., East Rutherford, N.J. 07073

[21] Appl. No.: 291,190

[22] Filed: Aug. 10, 1981

[51] Int. Cl.³ ............................................. B62M 5/00
[52] U.S. Cl. .................................. 280/259; 280/291; 74/594.1
[58] Field of Search ............... 280/291, 259; 74/594.1, 74/594.4, 560, 564, 562; 180/205

[56] References Cited

U.S. PATENT DOCUMENTS 3,960,027 6/1976 Magnuson ......................... 280/291

FOREIGN PATENT DOCUMENTS 90490 3/1959 Netherlands ......................... 280/291
733468 7/1955 United Kingdom ................ 280/291

*Primary Examiner*—John A. Pekar
*Assistant Examiner*—D. Lynn Fugate

[57] ABSTRACT

This footrest device is for use on the commonly known "moped", or bicycle, and represents a combination footrest and pedal. The footrest device comprises a pair of elongated members, which are fixedly secured to the ends of a rotatable crankaxle extending from the opposite sides of the vehicle. A pair of pedals are connected to the elongated members at diametrically positioned opposite ends. The pedals are used to manually rotate the crankaxle through the elongated members. When the pedals are not used the rider rests his feet upon the elongated members.

5 Claims, 9 Drawing Figures

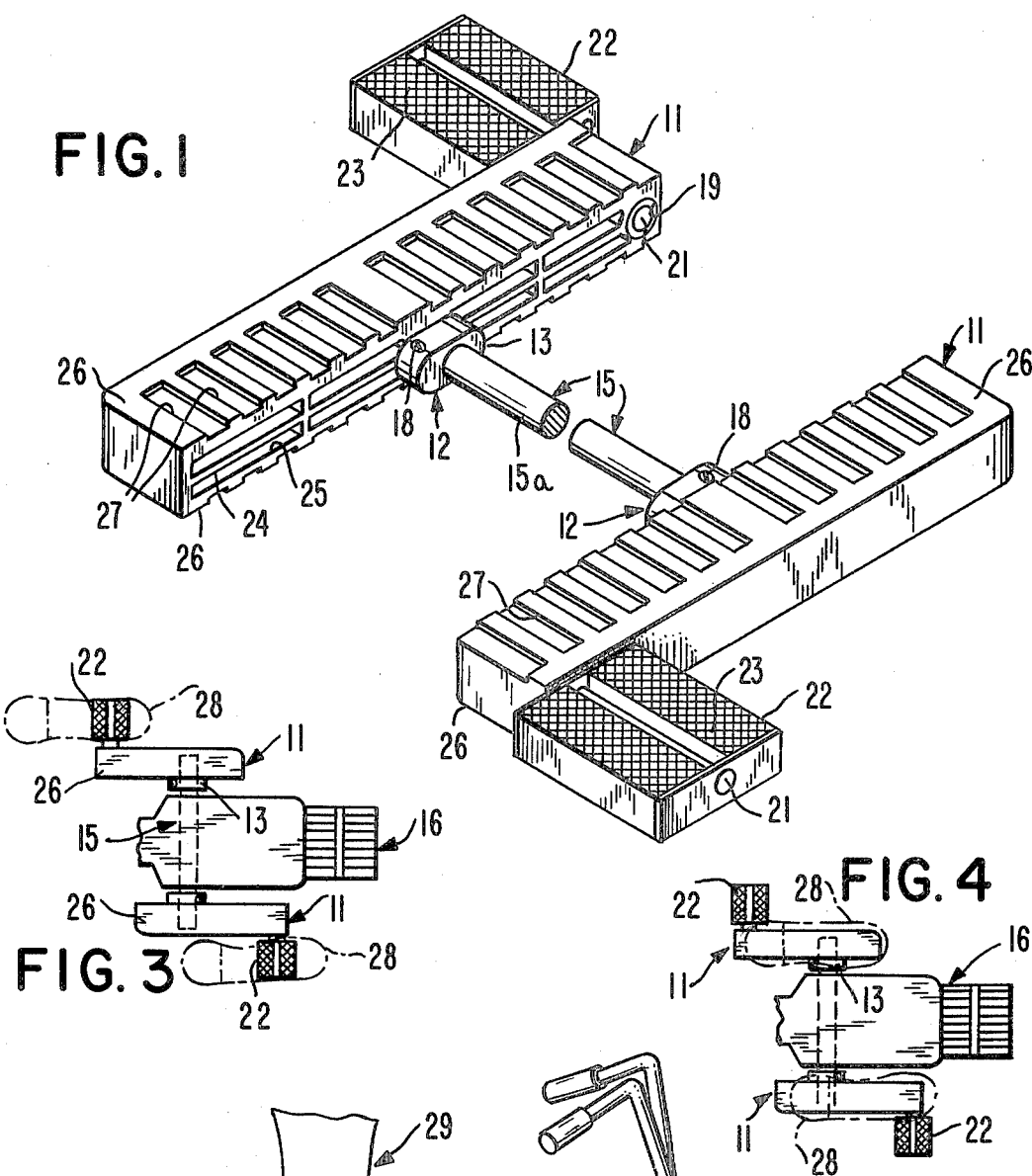
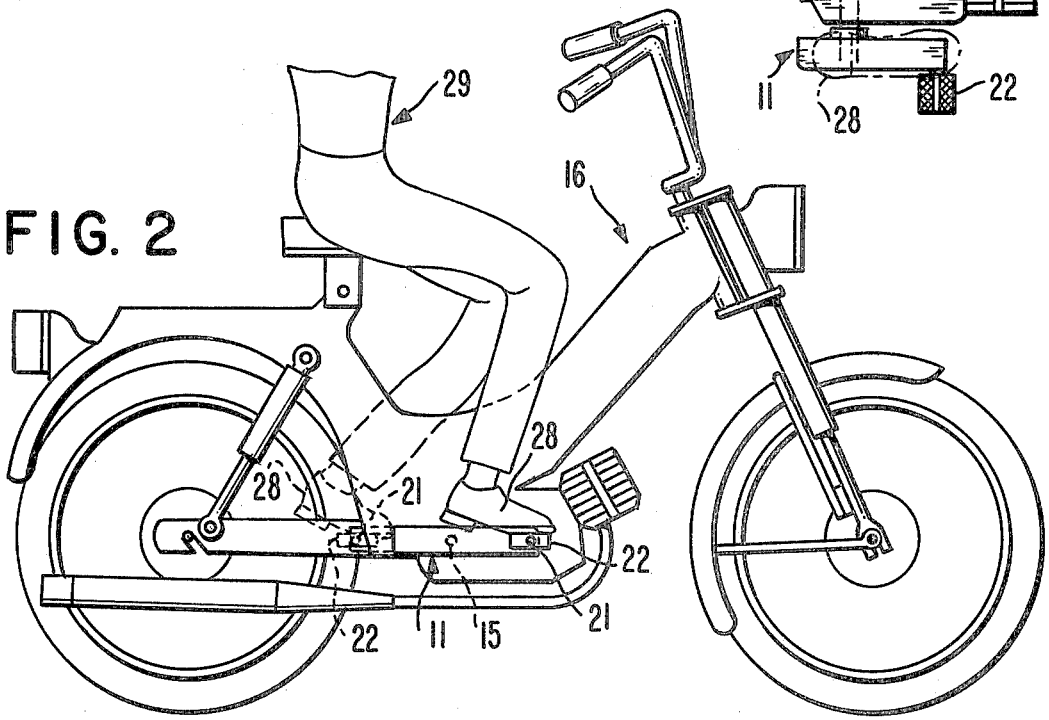

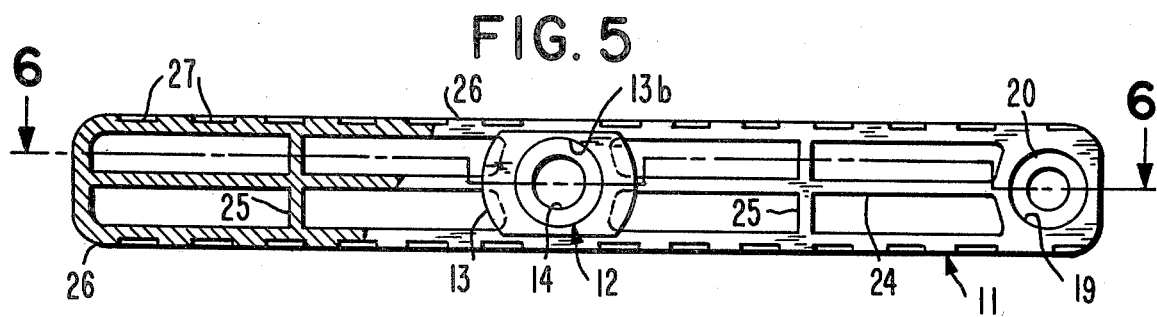
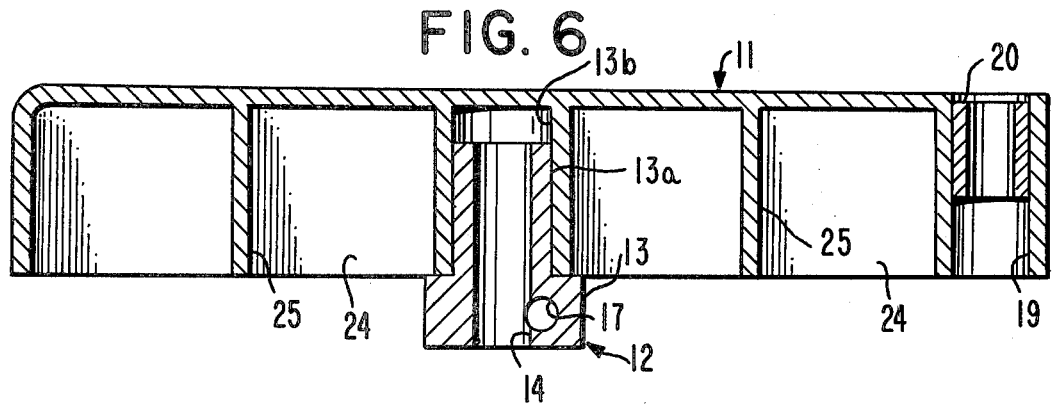
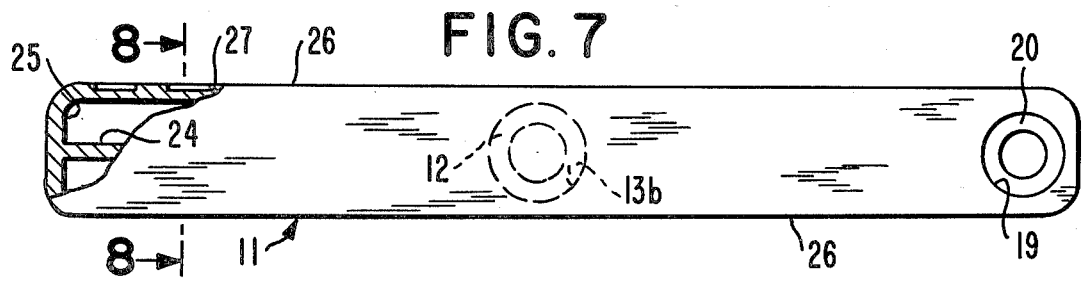
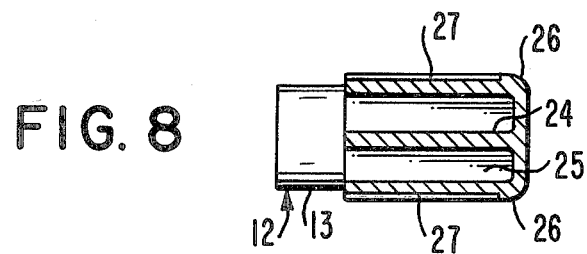
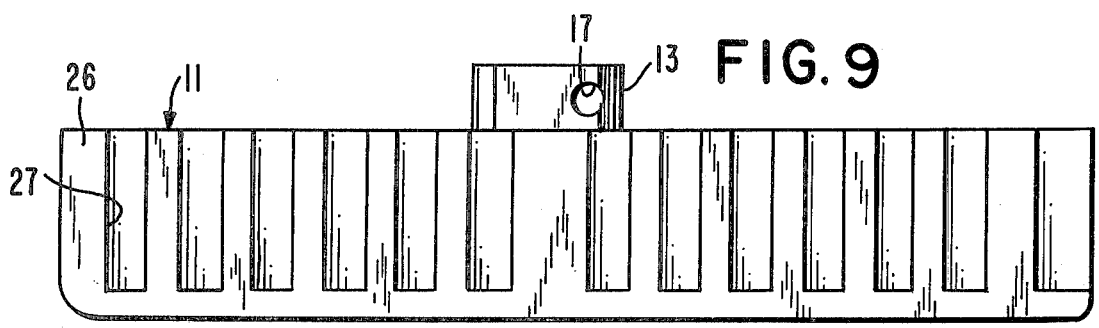

FOOTREST FOR TWO-WHEELED ENGINE DRIVEN VEHICLES AND BICYCLES

This invention relates to devices for two-wheeled vehicles, and more particularly, to a footrest for two-wheeled engine driven vehicles and bicycles.

It is, therefore, the principal object of this invention to provide a footrest for two-wheeled engine driven vehicles and bicycles, which will be of such structure, that it can be used as a combination pedal crank and footrest.

Another object of this invention is to provide a footrest for two-wheeled engine driven vehicles and bicycles, which will be unique, in that it will be used in pairs, and will provide greater comfort for the feet of the rider, and provide more stability than has been achieved by related devices of the prior art.

Another object of this invention is to provide a footrest for two-wheeled engine driven vehicles and bicycles, which will enable the rider's legs to be kept symmetrically on the large surface area of the footrests.

A further object of this invention is to provide a footrest for two-wheeled engine driven vehicles and bicycles, which will enable the rider to avoid placement of his feet on ordinary pedals, which is dangerous, particularly when navigating curves on bumpy roads.

A still further object of this invention is to provide a footrest for two-wheeled engine driven vehicles and bicycles, which will be particularly adaptable to vehicles, such as those commonly known as "mopeds," as the operator can keep his feet on the footrests most of the time, and on a bicycle, the rider can keep his feet on the footrests when riding downhill.

An even further object of this invention is to provide a footrest for two-wheeled vehicles and bicycles, which will enable a rider to keep part of his weight on his legs, so as to absorb vibration and shifting.

Other objects of the present invention are to provide a footrest for two-wheeled engine driven vehicles and bicycles, which is simple in design, inexpensive to manufacture, rugged in construction, easy to use and efficient in operation.

These, and other objects, will be readily evident, upon a study of the following specification, and the accompanying drawings, wherein:

FIG. 1 is a perspective view of the present invention, shown removed from a two-wheeled vehicle;

FIG. 2 is a side elevational view of a typical two-wheeled vehicle, showing the footrests installed, and illustrates the rider fragmentary;

FIG. 3 is a fragmentary top plan view of FIG. 2, showing the rider's feet positions in phantom lines, on the pedals of the invention, for pedaling the vehicle, which is commonly known as a "moped";

FIG. 4 is similar to FIG. 3, but illustrates the rider's feet in position on the rest portion of the invention, when the vehicle is being power driven;

FIG. 5 is an enlarged side elevational view of one of the footrests, shown partly broken away, with the pedal portion removed therefrom, for the sake of clarity;

FIG. 6 is a cross-sectional view, taken along the line 6—6 of FIG. 5;

FIG. 7 is a rear view of FIG. 5, shown partly broken away;

FIG. 8 is a cross-sectional view, taken along the line 8—8 of FIG. 7, and

FIG. 9 is a top plan view of FIG. 5.

According to this invention, a footrest device 10 is shown to include a pair of elongated and rectangular main bodies 11, preferably fabricated of aluminum. A steel bushing 12, having a flange 13, is knurled on its shank 13a, and is force fitted into opening 13b, in the center of each of the main bodies 11. Each bushing 12 includes an opening 14 on its longitudinal axis, which is adapted for connection to a crankaxle 15 extending through the vehicle 16, in a manner that is common in the art. The bushing 12 may represent an extension of the main body 11 with an opening adapted to receive a conventional crankaxle.

It is conventional in two wheeled engine driven vehicles using pedals to connect the pedals through a crankaxle. It is also conventional in some models to couple the crankaxle to the engine drive for starting the engine. After the engine is started, the coupling is disengaged. In the practice of the present invention the pedals may also be used to start the engine following the conventional procedure.

A threaded opening 17, of flange portion 13, is vertical thereof, and offset into opening 14, so as to receive a suitable set screw 18, that will engage with a slot in the outer periphery 15a (not shown) to thus lock shaft 15 into bushing 12. An opening 19, in one end of each of the main bodies 11, receives a knurled bushing 20, which is force fitted in opening 19, and the pin 21, of the pedals 22, is rotatably received and retained in the openings 19, in the manner common in the art and (not shown). The faces of pedals 22 are suitably covered with knurled, non-slip rubber. Each main body 11 includes internal rib portions 24 thereof, which define a plurality of openings 25, for strength and lightness of weight, and the top and bottom surfaces 26 are provided with a plurality of recessed grooves 27, for non-slip positioning of the feet 28 of the rider 29. The pedals 22 must be positioned at opposite ends of the main bodies 11 in diametrically opposed locations. The main bodies are rectangular with the length substantially larger than the width. The length should be at least about 10 inches to accommodate the riders foot. The long side adjoins the vehicle and is perpendicular to the crankaxle 15.

In use, device 10 employs the use of the elongated main bodies 11, for the rider to rest his feet 28 when the vehicle 16 is being driven by power means, and the pedals 22 of the combination enable the user to place his feet 28 thereon, for pedaling vehicle 16. When pedaling vehicle 16, the pedals 22 rotate on their respective pins 21, and the main bodies 11, serving as footrest means, are actually arm portions symmetrically extending from the center of the crankaxle as is more clearly illustrated in FIG. 1 of the drawing. The pedaling action rotates the main bodies 11 and the crankaxle 15. The crankaxle 15 is coupled in a conventional manner through a drive chain (not shown) for supplementing the engine drive. When the pedals are not used the rider places his feet on the footrest main bodies 11 which maintains them in planes parallel to one another and provides added stability and comfort.

It shall be noted, that this new footrest combines the advantages of the "mopeds", with pedals, as the "moped" can be moved with human power, if the engine stops, or can enable the rider, by pedaling, to help the engine, when climbing up hills. The use of pedals separate the "moped", from motorcycles (which is a very important fact for traffic law).

While various changes may be made in the detail construction, it is understood that such changes will be within the spirit and scope of the present invention, as is defined by the appended claims.

What I now claim is:

1. A footrest device for combination power driven and pedaled vehicles comprising in combination a rotatable crankaxle adapted to extend through the vehicle; a pair of elongated members extending from the center of the crankaxle transverse to its central axis and having flat surfaces in a symmetrical disposition on opposite sides of the vehicle for seating the feet of the rider upon said flat surfaces in a parallel plane at a substantially equal distance above the ground when the vehicle is being powered by its engine and a pair of pedals rotatably secured to said elongated members at diametrically opposite ends from one another for manually rotating said crankaxle through the rotation of said members when the feet of the rider are pedaling.

2. A footrest device as claimed in claim 1 wherein each of said elongated members have a substantially rectangular configuration with the longer dimension in a plane transverse to said crankaxle.

3. A footrest device as claimed in claim 2 further comprising a pin extending from each of said elongated members at said diametrically opposite ends with each of said pedals being rotatably connected to said pins.

4. A footrest device as claimed in claim 3 wherein each of said elongated members includes a bushing fixedly secured in an opening substantially centrally and partially through one side surface.

5. A footrest device as claimed in claim 4 wherein each of said bushings is fixedly secured to an end of said crankaxle.

* * * * *